United States Patent [19]

Griffiths

[11] Patent Number: 5,072,953
[45] Date of Patent: Dec. 17, 1991

[54] PIPE CENTERING DEVICE

[76] Inventor: Raymond P. Griffiths, 6 Beechwood Avenue, Melton Mowbray, Leicester., Leicestershire, England

[21] Appl. No.: 577,304
[22] Filed: Sep. 4, 1990

[30] Foreign Application Priority Data

Sep. 15, 1989 [GB] United Kingdom ............... 8920984

[51] Int. Cl.⁵ ........................................... B23B 31/40
[52] U.S. Cl. ................................. 279/2 R; 82/113; 269/48.1
[58] Field of Search ................ 279/2 R, 2 A; 82/113; 269/48.1, 48.2

[56] References Cited

U.S. PATENT DOCUMENTS

| | | | |
|---|---|---|---|
| 1,160,625 | 11/1915 | Long | 279/2 R X |
| 1,871,494 | 8/1932 | Carlson | 279/2 R X |
| 2,291,823 | 8/1942 | Mickelson et al. | 279/2 R X |
| 2,906,226 | 9/1959 | Myrick et al. | 269/48.1 X |
| 3,048,416 | 8/1962 | Rogers | 279/2 |
| 3,383,723 | 5/1968 | Connelly | 10/107 |
| 4,168,073 | 9/1979 | LaRue | 279/2 R |
| 4,767,125 | 8/1988 | Barry et al. | 279/2 R |

FOREIGN PATENT DOCUMENTS

| | | | |
|---|---|---|---|
| 217704 | 4/1987 | European Pat. Off. | 82/113 |
| 1922344 | 12/1978 | Fed. Rep. of Germany. | |
| 121294 | 10/1978 | Japan | 279/2 A |
| 629867 | 9/1949 | United Kingdom. | |
| 1229882 | 4/1971 | United Kingdom. | |
| 1236195 | 6/1971 | United Kingdom. | |

Primary Examiner—Steven C. Bishop
Attorney, Agent, or Firm—Pearne, Gordon, McCoy & Granger

[57] ABSTRACT

A mechanism for mounting a generally circular, hollow pipe 54 coaxial with a machine tool has a central shaft 10 with a dome-shaped head 12. A number of fingers 20 are equi-angularly spaced about the shaft 10 and pivoted at one end on the head 12. The fingers 20 in effect form a segmented cone. A collar is slidably mounted on the shaft and is coupled to the fingers by respective connecting members such that sliding movement of the collar towards and away from the head pivots the fingers radially of the shaft. In use, the open end of the pipe is located over the mechanism and the position of the collar adjusted to expand the fingers 20 to grip the inner wall of the pipe and hold the pipe firmly coaxial with the shaft 10. The end of the latter remote from the head 12 is secured to a machine tool axis to enable accurate machining of the pipe 54 by suitable tools which are mounted for movement about the machine tool axis.

7 Claims, 1 Drawing Sheet

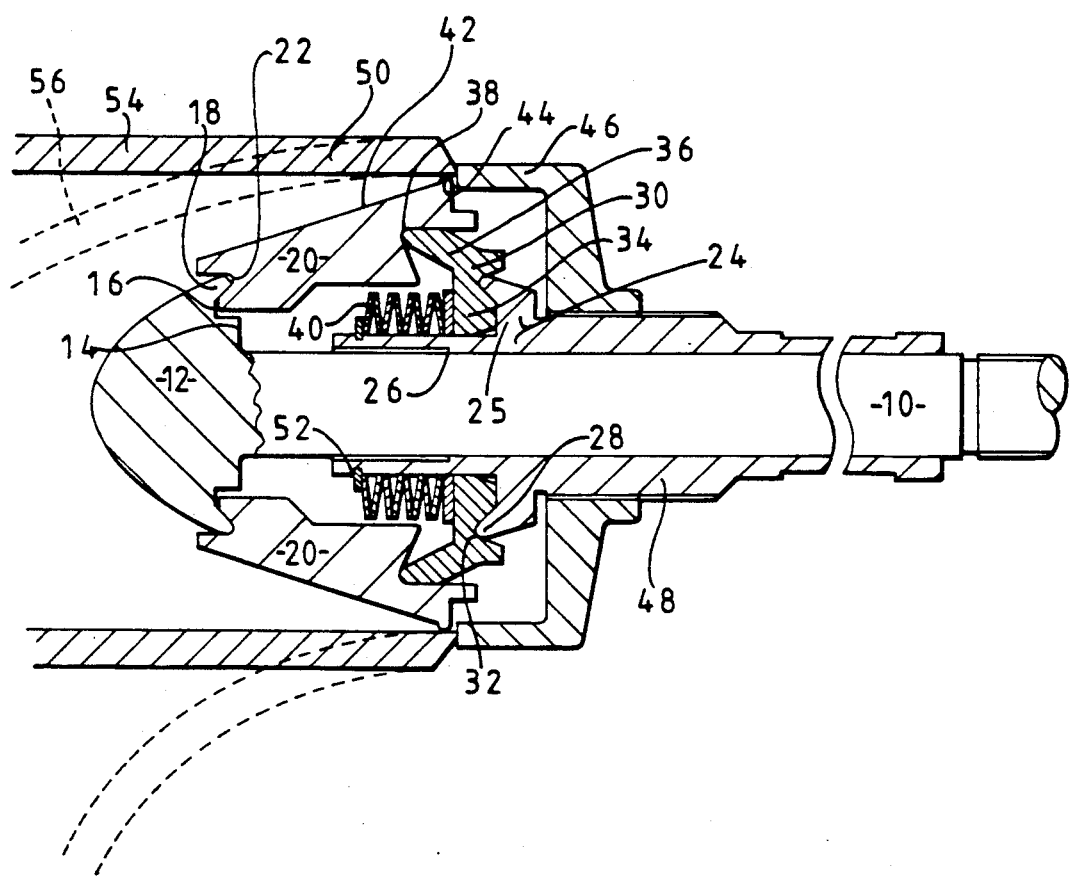

PIPE CENTERING DEVICE

BACKGROUND OF THE INVENTION

The present invention relates to a mechanism for mounting a generally circular, hollow moreover such as a pipe coaxial with a machine tool to enable accurate machining of the open end of the pipe.

When pipes are to be welded together, it is desirable that their abutting ends should be machined accurately to ensure that the pipe ends can be aligned together as accurately as possible prior to welding. Where one of the pipes to be welded is curved along its length to provide a preformed bend it has hitherto proved virtually impossible to machine accurately the end of the pipe to enable accurate alignment of the two pipes for welding.

The present invention seeks to provide an improved mechanism for mounting a pipe to enable accurate machining of its open end.

SUMMARY OF THE INVENTION

The present invention provides a mechanism for mounting a generally circular, hollow member such as a pipe coaxial with a machine tool, the mechanism comprising:

an elongate support means;

a generally conically shaped, segmented member coaxially supported by said support member; and coupling means coupling said segmented member to said support means, said coupling means being supported on said support means for axial movement relative thereto whereby said relative axial movement of the coupling means and said support means causes expansion or contraction of said segmented member between first, expanded and second, contracted extreme positions radially of said support means;

and wherein said segmented member has a radially outer friction surface for bearing against an inner surface of said pipe for securing said pipe coaxial with said mechanism.

DESCRIPTION OF THE DRAWINGS

The present invention is further described hereinafter by way of example, with reference to the accompanying drawing which is a partial longitudinal section through one embodiment of a mechanism according to the present invention.

DETAILED DESCRIPTION

The mechanism shown in the drawings has a central shaft 10 provided at one, forward end with a dome-like or part spherical, enlarged head which overhangs the body of the shaft 10. The other end of the shaft 10 is adapted, for example by provision of an external screw-thread, to be secured to a machine tool to enable a cutting tool of the machine tool to be rotated about the longitudinal axis of the shaft to machine an open end of a pipe 54 attached to the mechanism.

As mentioned above, the head 12 overhangs the body of the shaft 10 to provide a shoulder 14 adjacent the shaft. An annular groove 16 is formed radially outwardly of the shoulder 14 and opens rearwardly of the mechanism so that the portion of the head radially outwardly of the groove defines an annular ridge or flange 18 which serves as a bearing surface for a plurality of fingers 20. In the present example, although only two diametrically opposed fingers are shown in the drawing, the mechanism has between ten and twelve fingers. The fingers 20 are angularly spaced about the shaft 10 to form a segmented, generally conical member. The forward end of each finger 20 is provided with a notch 22 into which the bearing surface 18 engages. This allows radial pivot movement of the fingers 20 about the bearing surface 18 to cause expansion or contraction of the conical member.

A collar 24 is mounted coaxially on the shaft 10 rearwardly of the head 12 and is slidable on the shaft towards and away from the head. The collar 24 has a radially outwardly extending annular flange 25 and a sleeve-like extension 26 which extends forwardly of the flange 25 towards the head 12. The flange 25 has an upstanding ridge 28 extending generally forwardly of the flange 25 to provide a second annular bearing surface.

A plurality of connecting members 30, corresponding in number to the fingers 20, are provided on the collar 24, each member being provided with a notch 32 into which the second bearing surface 28 engages to allow the connecting members 30 to pivot radially of the collar 24 about the bearing surface 28. Each connecting member 30 is of generally "L" shape having two limbs 34, 36 with one limb 34 extending radially inwardly and the second limb 36 extending forwardly of the flange 25 to engage in a second notch 38 in the rear end portion of the cooperating finger 20.

Each finger 20 also has on its radially outer surface at or adjacent its rear end a friction surface which in the illustrated mechanism is conveniently in the form of a radiussed ridge 44. However, a step formation or even a plain surface may suffice. The friction surface 44 forms the radially outermost portion of each finger 20.

The inner limb 34 of the connecting member 30 is biased rearwardly against the flange 25 by a spring 40 coaxially mounted on the extended portion 26 between a suitable stop such as a circlip 52 and the limb 34.

A generally cup-shaped member 46 has a central, screw-threaded bore 48 by means of which the member 46 is coaxially mounted on the collar 24. Rotation of the cup-shaped member 46 on the member 26 adjusts the axial position of the cup-shaped member 46 on the collar 24. The cup-shaped member 46 has a generally annular side wall which extends forwardly of the mechanism coaxial with the shaft 10. The free end edge of this wall acts a stop to position the end edge of the pipe 54 when the latter is positioned on the mechanism.

As will be appreciated, the fingers 20 form a generally conically shaped member which can be radially expanded or retracted by movement of the collar 24 along the shaft 10 towards and away from the head 12.

In use the collar is retracted, as a result of which the fingers 20 pivot inwardly to contract the conically shaped member. The open end 50 of the pipe 54 is then engaged over the fingers 20 from the forward end of the mechanism, the cup-shaped member 46 limiting the depth to which the forward end of the mechanism engages into the pipe. The position of the cup-shaped member 46 on the collar 24 can be adjusted as desired. The collar 24 is then moved axially in relation to the shaft 10 towards the head 12, to expand the conically shaped member until the friction surface of the fingers 20 engages the inner surface of the pipe 54. The cup-shaped member 46 can then be retracted to allow access for machining the end of the pipe.

As a result of movement of the collar 24 towards the head 12 the spacing between the bearing surfaces 18 and 28 decreases. The engagement of the limb 36 of the connecting member 30 in the notch 38 prevents the forward end of the limb 36 moving towards the head 12. As a result of this, the action of the annular bearing surface 28 on each connecting member forces the latter to pivot about the bearing surface 28, the upper connecting member 30 as shown in the drawing pivoting in a clockwise direction and the lower connecting member pivoting in an anti clockwise direction.

The pivoting of each connecting moreover 30 thus pivots each finger 20 radially outwardly about the bearing surface 18 to expand the conically shaped member and bring the friction surface 44 into engagement with the inner surface of the pipe 54. The pipe is therefore securely held on the mechanism by the frictional engagement of the ridge 44 against the inner wall of the pipe with the shaft 10 axially aligned with the longitudinal axis of the pipe. This would be the case even where the pipe is a curved pipe such as is shown in dashed lines in the drawing.

The cup-shaped member 46 can then be fully withdrawn to allow accurate machining of the end region of the pipe by the machine tool on which the mechanism is mounted.

I claim:

1. A mechanism for mounting a generally circular, hollow member such as a pipe coaxial with a machine tool, the mechanism comprising:

an elongate support means;

a generally conically shaped, segmented member coaxially supported by said support member;

coupling means coupling said segmented member to said support means, said coupling means being supported on said support means for axial movement relative thereto whereby said relative axial movement of the coupling means and said support means causes expansion or contraction of said segmented member between first, expanded and second, contracted extreme positions radially of said support means;

and wherein said segmented member is provided on its radially outer surface at or adjacent its rear end with a friction surface in the form of a radiussed ridge for bearing against an inner surface of said pipe for securing said pipe coaxial with said mechanism.

2. A mechanism as claimed in claim 1 wherein said segmented member comprises a plurality of elongate members each of which is pivotally mounted at or adjacent one end thereof relative to the elongate support means, and wherein axial movement of said coupling means relative to said support means pivots said elongate members radially of said support member between said first and second positions.

3. A mechanism as claimed in claim 2 wherein said coupling means comprises a first member slidable axially on said support member and a plurality of connecting members pivotally coupling said first member to said elongate members.

4. A mechanism as claimed in claim 3 wherein each said connecting member is pivotally coupled to an associated elongate member.

5. A mechanism as claimed in claim 3 wherein sad coupling means comprises a sleeve-like member coaxially mounted on said support means and wherein each said connection member serves as a first order lever with a first portion acting on the associated elongate member and a second portion adjacent said sleeve-like member, there being further provided biasing means which bias said segmented member to said second position, and said connecting member being pivotally coupled intermediate said portions to said sleeve-like member.

6. A mechanism as claimed in claim 5 wherein each said connecting member is formed by a first limb extending generally radially of said support means and a second limb extending forwardly of said first limb at an obtuse angle thereto, a free end of said second limb pivotally engaging in a recess in the associated elongate member, and said connecting member being pivoted to said sleeve-like member at or adjacent the juncture of said two limbs.

7. A mechanism as claimed in claim 6 wherein said sleeve-like member has a generally annular bearing surface upstanding on said sleeve-like member and engaging in a recess of said connecting member to serve as a pivot therefor.

* * * * *